Feb. 2, 1965  F. G. WILLIAMS, JR  3,168,377
METHOD FOR THE DETERMINATION OF PROTEIN BOUND IODINE
Filed May 12, 1960  3 Sheets-Sheet 1

FRED G. WILLIAMS JR.
INVENTOR

BY *Flehr and Swain*
ATTORNEY

Feb. 2, 1965  F. G. WILLIAMS, JR  3,168,377
METHOD FOR THE DETERMINATION OF PROTEIN BOUND IODINE
Filed May 12, 1960  3 Sheets-Sheet 2

FRED G. WILLIAMS JR.
INVENTOR

BY *Fleke and Swain*
ATTORNEY

FRED G. WILLIAMS JR.
INVENTOR

United States Patent Office 3,168,377
Patented Feb. 2, 1965

3,168,377
METHOD FOR THE DETERMINATION OF PROTEIN BOUND IODINE
Fred G. Williams, Jr., Palo Alto, Calif., assignor to Beckman Instruments, Inc., a corporation of California
Filed May 12, 1960, Ser. No. 28,710
13 Claims. (Cl. 23—230)

This invention relates generally to a method for the determination of protein bound iodine and more particularly for the determination of protein bound iodine in blood serum.

The determination of protein bound iodine in blood serum follows generally three steps: (a) separation of inorganic iodine from protein bound iodine; (b) destruction of the protein bound iodine with conversion of bound iodine to an inorganic form; and (c) determination of the concentration of resulting inorganic iodine.

In the prior art, step a is accomplished by chemically precipitating the protein of serum, centrifuging, and discarding the supernate. This is followed by suspending the precipitated protein in water, again centrifuging, and discarding the wash solution, and repeating the washing step a number of times. The number of centrifugations required is time consuming.

Step b is accomplished by either of two methods (1) ashing the dry precipitate with sodium carbonate to form sodium iodide; or (2) digesting with chromic acid, permanganate or chloric acid to form iodic acid, and then distilling the iodine formed by reduction with hypophosphorous acid. The vapors are absorbed in alkaline solution to form the iodide.

In the first method, two or more hours are required to dry the precipitated protein without ebullition, after addition of solution of sodium carbonate. Three to six hours are required for ashing in a muffle furnace. The ashing must be rather slow and at a controlled temperature so that vapors are not lost. Because of the small amounts of iodine which are, in general, present, there is the danger of cross-contamination from one sample to the next if many are placed in the furnace at one time.

The second method, distillation, is more complex than ashing. Each distillation must be carefully watched by a skilled operator to determine completeness. Generally, a battery of stills cannot be managed by a single operator.

Since there are about $6 \times 10^{-8}$ grams of iodine in the usual 1 ml. sample of an average serum, contamination of reagents, apparatus, or environment with trace amounts of iodine can provide a great source of error in the determination of protein bound iodine. The reagents must be selected to have exceptionally low iodine content and the maintenance of a special laboratory is, in general, required to carry out an analysis of this type. There are substances other than iodine, for instance, mercury, which interfere with detection and these must also be especially excluded.

Step c is accomplished by observing the catalytic effect of the resulting inorganic iodine on the rate of reduction of ceric ions to colorless cerous ions by arsenite. In general, the rate is determined by placing the sample in a colorimeter and observing the change of transmittance with time.

It is, therefore, a general object of the present invention to provide an improved method for determination of protein bound iodine.

It is another object of the present invention to provide a method for determination of protein bound iodine in which no chemicals need be added in steps a and b of the above method, and thus eliminate a source of contamination.

It is another object of the present invention to provide an improved method which is suitable for rapid analysis.

It is another object of the present invention to provide a method in which the analysis can be performed on microquantities.

It is another object of the present invention to provide a method in which the protein including bound iodine is combusted by transferring energy to the same without introduction of other combustion products.

It is still another object of the present invention to provide a method of determining protein bound iodine in which contamination due to reagents, surrounds and the like is maintained at a minimum and in which the likelihood of cross-contamination is also minimized.

Briefly, the objects of the invention may be accomplished by placing a small amount of the sample to be analyzed on a coiled filament. Electric current is passed through the filament to dry the sample and form a gel which is retained on the filament. The filament including the gel is placed in an electrolytic bath and the inorganic iodine is removed by electrophoresis and electrolytic action. The filament carrying the gel is again heated to dryness and then placed in a small vessel containing enough oxygen to oxidize the protein and some water to absorb the combustion products containing the iodine. The sample is combusted by transfer of energy to the same as, for example, by passing heavy currents through the filament. The combustion products are absorbed in the water. The catalytic action of the resulting solution is employed as a measure of iodide content.

Other objects of the invention will become more clearly apparent from the following description when taken in conjunction with the accompanying drawing.

Referring to the drawing:

FIGURE 1 is an elevational view, partly in section, illustrating apparatus suitable for carrying out the present invention;

FIGURES 2A and 2B schematically illustrate the steps in carrying out a determination in accordance with the present invention;

Figure 1:
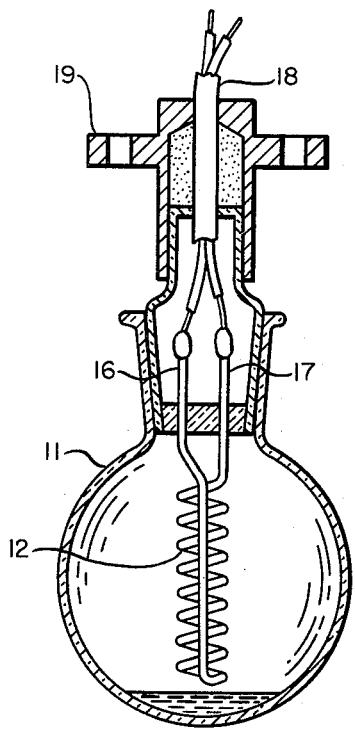

Apparatus suitable for carrying out the method of the present invention is illustrated. It includes a vessel or flask 11 adapted to accommodate a coiled filament 12. The filament is supported by a stopper, for example, glass, which forms a suitable seal with the neck of the vessel. The two ends 16 and 17 of the coil 12 extend through the stopper. Electrical contact may be made to the ends by means of the cord 18 held in the ferrule 19.

The coil 12 may be helically wound with a plurality of closely spaced convolutions of filamentary material. A sample applied to the coil is retained within the coil by surface forces.

Figure 2A:
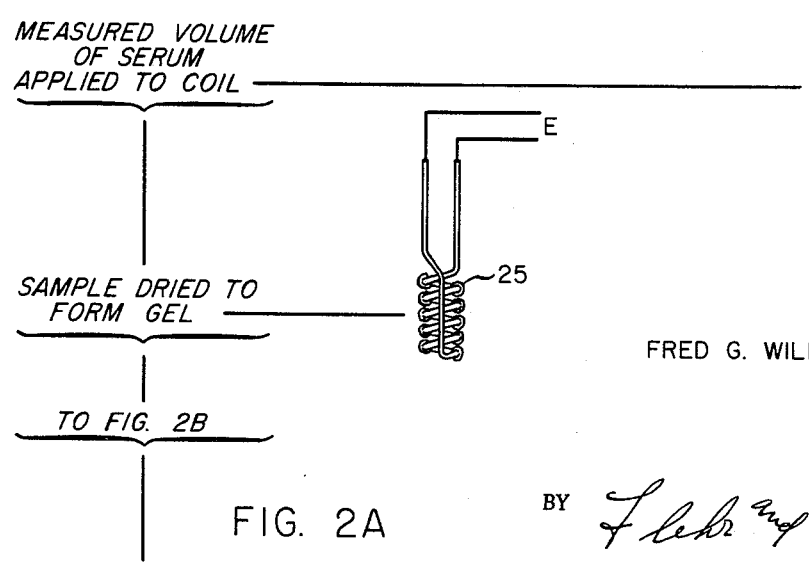

In accordance with the present invention, a known volume of sample 20 to be processed is applied to the filament as, for example, with a pipette 21, FIGURE 2A. The sample is retained by the filament by surface forces. Prior to application of the sample, the filament is washed and an electric current is then passed through the same to burn off or volatilize any film or deposits on the filament.

The sample is then dried to form a gel or loosely formed adherent solid mass hereinafter referred to as a gel. The drying may be achieved by applying a voltage to the filament ends, FIGURE 2A. The current which flows through the coil heats the coil and sample to dry the sample. The voltage is so selected that the drying is relatively slow to avoid sputtering and the consequent loss of sample. A gel 25 is formed which is retained or held by the filament.

Figure 2B:
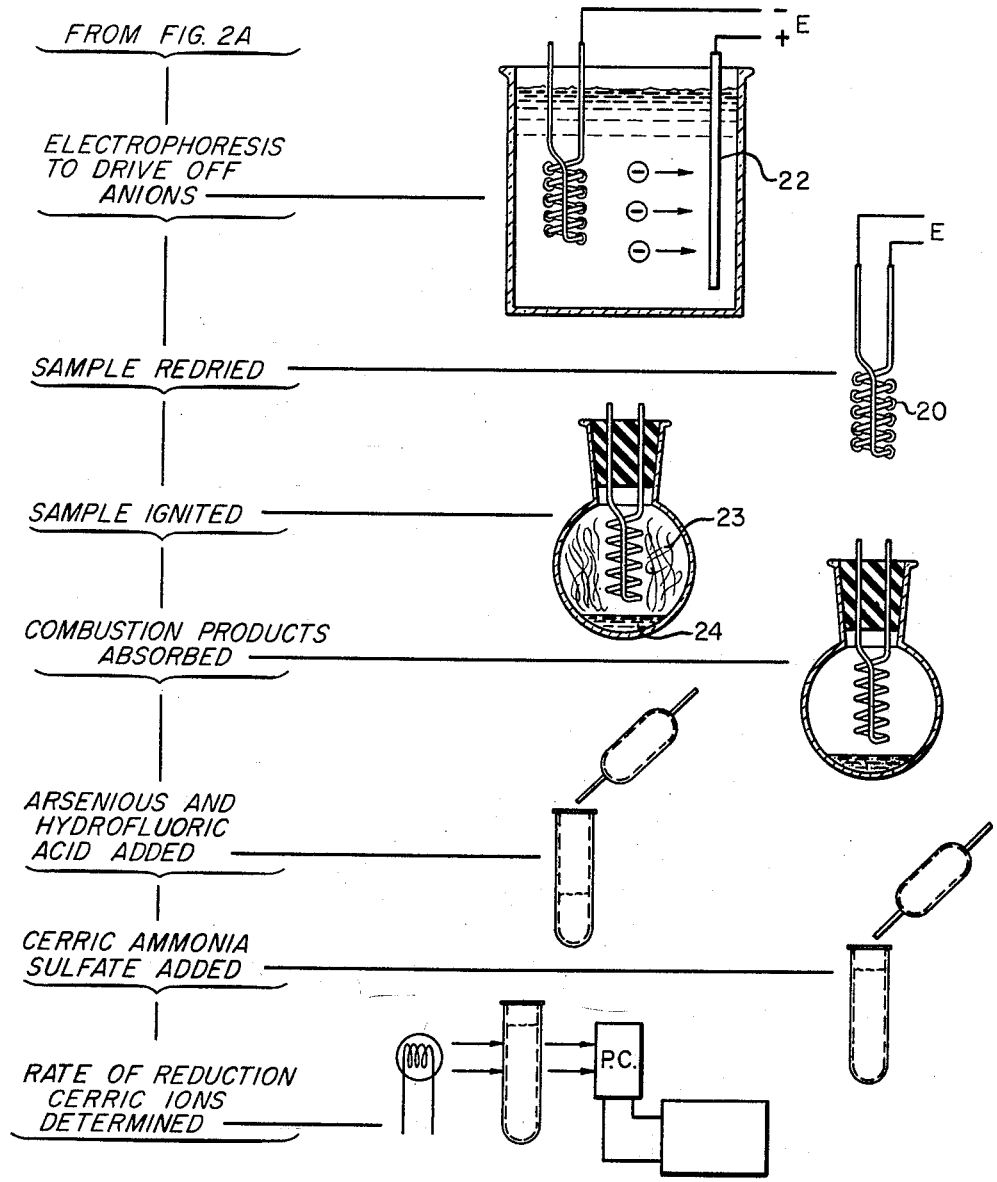

The next step is to remove the unbound iodine. This is achieved in the present invention by making the filament the cathode in an electrolytic cell, as shown in FIGURE 2B, with an iodine free electrolyte such as distilled water. The original anions of the sample, including inorganic iodide, are driven from the protein gel essentially by electrophoresis through the gel. The gel actually serves as the supporting medium for electrophoresis, and the electric field gradient which causes the anions to migrate out into the solution exists across the gel. This step serves to remove all of the free anions including the inorganic iodide whereby only protein bound iodide, immobile in the electric field, remains in the gel.

Subsequently, the filament, carrying the sample which is now free of unbound iodine, is again electrically heated to dryness with care being exercised not to cause sputtering.

The bound iodide is freed by inserting the filament into a small vessel or flask containing a quantity of oxygen (with or without other gases) more than sufficient to oxidize the protein. The sample is then combusted by elevating its temperature. One method of elevating its temperature is to pass a heavy current through the filament so that the filament heats to incandescence. The sample is combusted to form a smoke or vapor 23 which is absorbed in the small amount of distilled water 24 initially placed in the combustion vessel.

Convection produced by the heat circulates the combustion products and enhances absorption. The combustion products are absorbed in the water to a reproducible extent. The combustion destroys the protein and converts the bound iodine into its inorganic form. The inorganic iodine can be determined by conventional methods, for example, those set forth in step c above.

In accordance with this step, arsenious and hydrochloric acids are mixed with the aqueous solution in a cuvette or tube. Time is allowed for the iodate formed at combustion to be reduced to iodide. The cuvette is placed in a colorimeter capable of maintaining a substantially constant temperature. Ceric ions are introduced to the sample and the optical transmission of the sample is observed as a function of time. A plot gives a curve whose slope is indicative of the rate of reduction of the ceric ions, and thus of the amount of inorganic iodine present.

Figure 3:
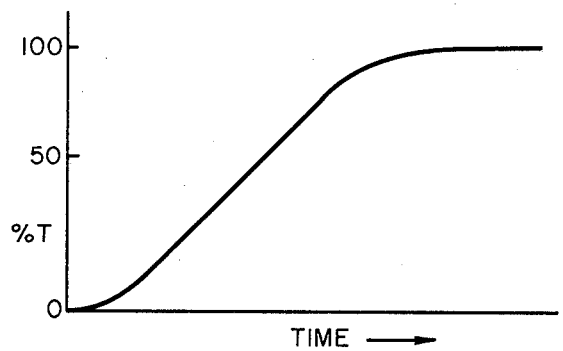
FIGURE 3 shows a typical curve showing the rate of reduction of ceric ions.

FIGURE 3 shows a typical curve of transmittance, $T$, as a function of time, $t$. The concentration can be obtained from the slope of the curve, $\Delta T/\Delta t$.

Figure 4:
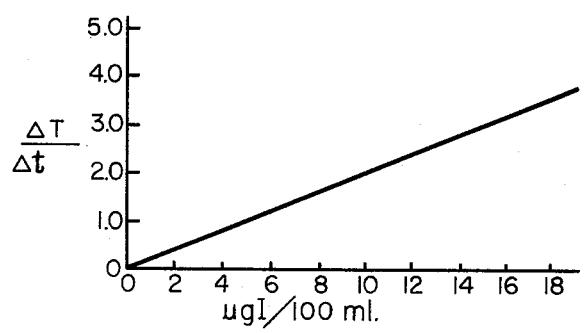
FIGURE 4 shows a typical calibration curve.

By carrying out several determinations with known amounts of iodine with given reagents, it is possible to draw a calibration curve which will take into account iodine in the reagents. Such a curve is shown in FIGURE 4. Thus, knowing the slope, one can easily find the concentration of the iodine from the chart.

By way of example, the foregoing procedure for determining protein bound iodine was employed to determine the iodine content of standard solutions which had known amounts of iodine (determined by presently available methods). Each run was carried out as follows:

(1) 50 microliters of serum were applied to the platinum coil which was 6 turns of a 10% rhodium alloy wire 0.025 inch in diameter wound into a 1/8 inch inside diameter spiral with overall length of 5/16 inch. The serum was dried for 10 minutes by the passage of current through the coil.

(2) The dried samples were placed in an electrolytic cell with 150 volts applied between the cathode and anode spaced about 2 cm. apart and maintained for 5 minutes to remove inorganic iodide.

(3) The sample was re-dried for 10 minutes.

(4) 300 microliters of deionized water were inserted into the flask.

(5) Air was displaced from the flask by a stream of oxygen.

(6) The coil carrying the protein bound iodine was placed in the flask.

(7) The coil was heated to combust the sample by the passage of 40 amperes of current for 8/10 of a second.

(8) 30 minutes was allowed for combustion products to absorb in the water.

(9) The flask was opened and 200 microliters of the solution were aliquoted to a cuvette.

(10) 80 microliters of 0.2 N solution of arsenious acid were added to the solution in the cuvette and mixed.

(11) 10 microliters of 0.33 N hydrochloric acid were added and mixed.

(12) The cuvette with a 1 cm. path length was placed in a Beckman DK–2 spectrophotometer with light at 420 millimicrons. The colorimeter maintained the solution at 40° C.

(13) 80 microliters of 0.02 N ceric ammonium sulphate at 40° C. was mixed thoroughly into the cuvette with the sample.

(14) The reaction was timed by beginning the timing period when 35% transmission had been reached, and the timing was stopped when 66% transmission was reached.

(15) The concentration of bound iodine was obtained from a calibration curve of the type shown.

The overall time for carrying out the first two steps was 55 minutes.

Table I shows the results obtained in the analysis of serum samples from six normal individuals:

*Table I*

| Serum No. | Assayed Value, g.I/100 ml. | Value found by present method, g.I/100 ml. |
|---|---|---|
| 1 | 4.5 | 4.1 |
| 2 | 3.8 | 3.9 |
| 3 | 4.2 | 3.5 |
| 4 | No Assay | 4.5 |
| 5 | No Assay | 6.5 |
| 6 | No Assay | 4.0 |

It was also found that the method and apparatus were capable of repeatedly obtaining the same reading for the same serum indicating that the results can be duplicated. For example, 12 tests for the same sample showed a deviation of only 7.2% from the mean value of 3.6 micrograms protein-bound iodine per 100 milliliters blood serum.

It is, of course, apparent that if it is desired to obtain the total iodine content, the electrophoresis step may be eliminated and the sample dried and combusted to free the bound iodine.

Figure 5:
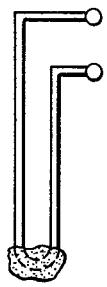
FIGURES 5, 6 and 7 show other configurations suitable for the electrical supporting and heating element.
Figure 6:
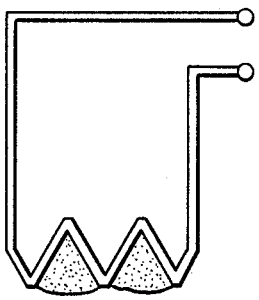
Figure 7:
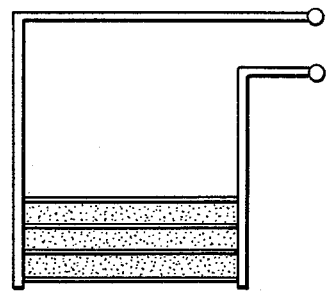

Referring to to FIGURES 5–7, other suitable configurations for the filaments are shown. In FIGURE 5, the filament is in the form of an inverted U. The sample is retained at the turn. In FIGURE 6, the filament is zig-zag with the sample retained between adjacent straight portions by surface forces. In FIGURE 7, the sample is retained between the adjacent straight filament portions. The embodiment of FIGURE 7 will operate at relatively low voltages. It is noted that in all instances the sample is retained on the filament by surface forces.

Although the foregoing description has reference to filaments of various configurations which retain the sample and heat the same to dry or combust it, other means for transferring heat to the sample without contaminating it are available and may work equally as well in carrying out the method of the present invention.

Figure 8:
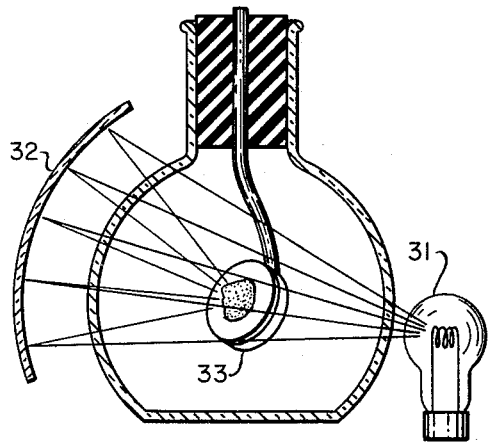
FIGURE 8 shows an apparatus which includes radiant heating of the sample.
Figure 9:
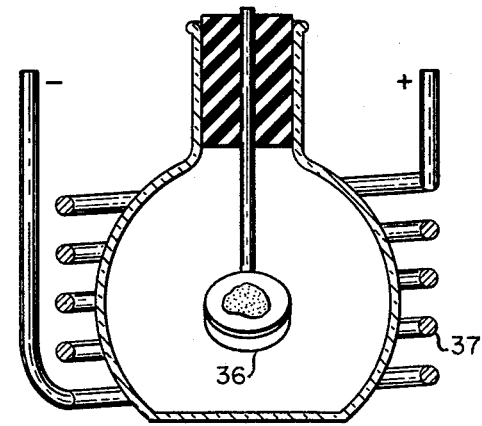
FIGURE 9 shows an apparatus including R.F. heating of the sample.

Referring to FIGURES 8 and 9, two other methods of applying heat to the sample without danger of contamination are schematically illustrated.

In FIGURE 8, a source 31 of radiant heat, for example, an incandescent lamp, is disposed so that the reflecting lens 32 intercepts the energy and focuses it into the cup 33 which retains the sample.

In FIGURE 9, heat is transferred to the sample by induction heating. The sample is retained in a graphite cup 36 which is coupled to the fields from the coil 37. The currents induced in the cup serve to heat it.

Figure 10:
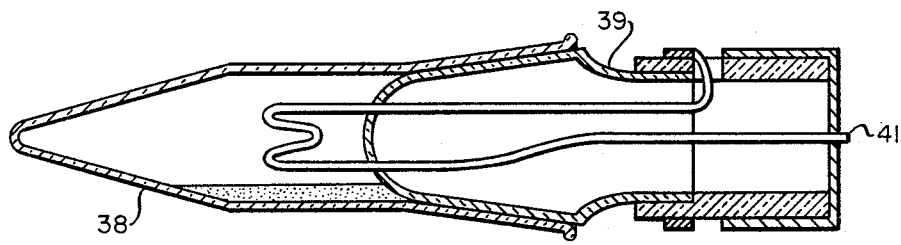
FIGURE 10 shows apparatus of the foregoing character suitable for use directly in centrifugation.

In FIGURE 10 there is shown apparatus in which the flask is in the form of a centrifuge tube 38. Following combustion, the absorbing liquid can be shaken onto the filament to wash it off and the whole assembly placed in a centrifuge rotor to isolate the absorbent at the end of the tube. The apparatus illustrated includes a stopper 39 which carries the filament 41, and means for making electrical connection to the ends.

I claim:

1. In the method of separating protein bound iodine from inorganic iodine in a sample and converting the protein bound iodine to inorganic iodine, the steps of drying the sample to form a gel, placing the gel in an electrolyte, applying a voltage gradient across the sample to remove the inorganic iodine from the gel by electrophoresis, placing the remaining gel in an enclosed atmosphere containing oxygen, and combusting the gel to convert the protein bound iodine in the gel to inorganic iodine.

2. In the method of separating protein bound iodine from inorganic iodine in a sample and converting the protein bound iodine to inorganic iodine, the steps of applying the sample to a holder, drying the sample to form a gel, placing the holder in an electrolytic bath and removing the inorganic iodine from the gel by electrophoresis, removing the holder with the protein bound iodine from the electrolytic bath, enclosing the holder in an atmosphere containing oxygen and without addition of chemicals to the gel combusting the gel to convert the protein bound iodine to inorganic iodine.

3. In the method as in claim 2 including the additional step of drying the gel after removal from the bath.

4. In the method as claim 2 wherein the holder is made of conductive material and a current is passed through the holder to heat and thereby dry the sample.

5. In the method as in claim 2 wherein the sample is dried by heat applied by inductive heating.

6. In the method as in claim 2 wherein the sample is dried by heat transferred by radiant energy.

7. In the method as in claim 2 wherein said holder is made the cathode in the electrolytic bath which also contains an anode and a voltage is applied between the cathode and anode to remove the anions through the gel by an electrophoretic action.

8. The method of determining protein bound iodine in a sample which comprises the steps of drying the sample to form a gel, placing the gel in an electrolytic bath, apply a voltage gradient across the gel to remove the inorganic iodine from the gel by electrophoresis, placing the gel in a vessel containing an atmosphere of oxygen sufficient to burn all of the protein and an absorbing liquid, combusting the sample to form combustion products, absorbing the combustion products in the liquid to form a solution, and determining the amount of inorganic iodine in the solution to thereby give an indication of the protein bound iodine.

9. A method as in claim 8 wherein the determination of inorganic iodine is made by observing the catalytic effect of the iodine on the reduction of ceric ions.

10. The method of determining protein bound iodine in a liquid sample which comprises the steps of supporting by capillary forces the liquid sample on a holder, drying the sample, placing the holder and sample in an electrolytic bath, applying a voltage gradient across the sample to remove the inorganic iodine from the dried sample by electrophoresis, placing the remaining sample and holder in an atmosphere containing oxygen, and by application of heat combusting solely the remaining sample to convert the bound iodine to inorganic iodine.

11. The method of separating inorganic iodine in a sample from protein bound iodine which comprises the steps of drying the sample, placing the dried sample in an electrolyte and applying a voltage gradient across the sample to remove the inorganic iodine from the dried sample by electrophoretic action.

12. The method of separating inorganic iodine in a sample from protein bound iodine which comprises the steps of applying the sample to a holder, drying the sample, placing the holder as a cathode in an electrolytic bath including an anode, and removing the inorganic iodine anions from the dried sample by applying a voltage between the holder and anode.

13. The method of separating inorganic iodine in a sample from protein bound iodine which comprises the steps of applying the sample to a holder made of conductive material, drying the sample by passing current through the holder and supporting the dried sample in the holder, suspending the holder as a cathode in an electrolytic bath containing an anode, and removing the inorganic iodine anions from the dried sample by applying a voltage between the holder and anode.

References Cited in the file of this patent

UNITED STATES PATENTS

| | | |
|---|---|---|
| 2,085,898 | Cardone | July 6, 1937 |
| 2,676,092 | Allen | Apr. 20, 1954 |
| 2,754,178 | Mack | July 10, 1956 |
| 2,780,528 | Fossam | Feb. 5, 1957 |
| 2,937,126 | Rosenberg | May 17, 1960 |
| 2,946,665 | Skeggs | July 26, 1960 |
| 2,950,176 | Thaver | Aug. 23, 1960 |
| 2,955,999 | Tirrell | Oct. 11, 1960 |
| 3,057,692 | Kirk | Oct. 9, 1962 |

OTHER REFERENCES

Hawk: Pract. Phys. Chem., 13th ed., 1954, pp. 661–662.

Lederer: Anal. Chim. Acta., vol. 17, 1957, pp. 606–607.

Kolnitz et al.: Ind. and Eng. Chem., Anal. ed. 5, 38, 39 (1933).

McHargue et al.: Ibid 6, 318, 319 (1934).